Patented May 12, 1936

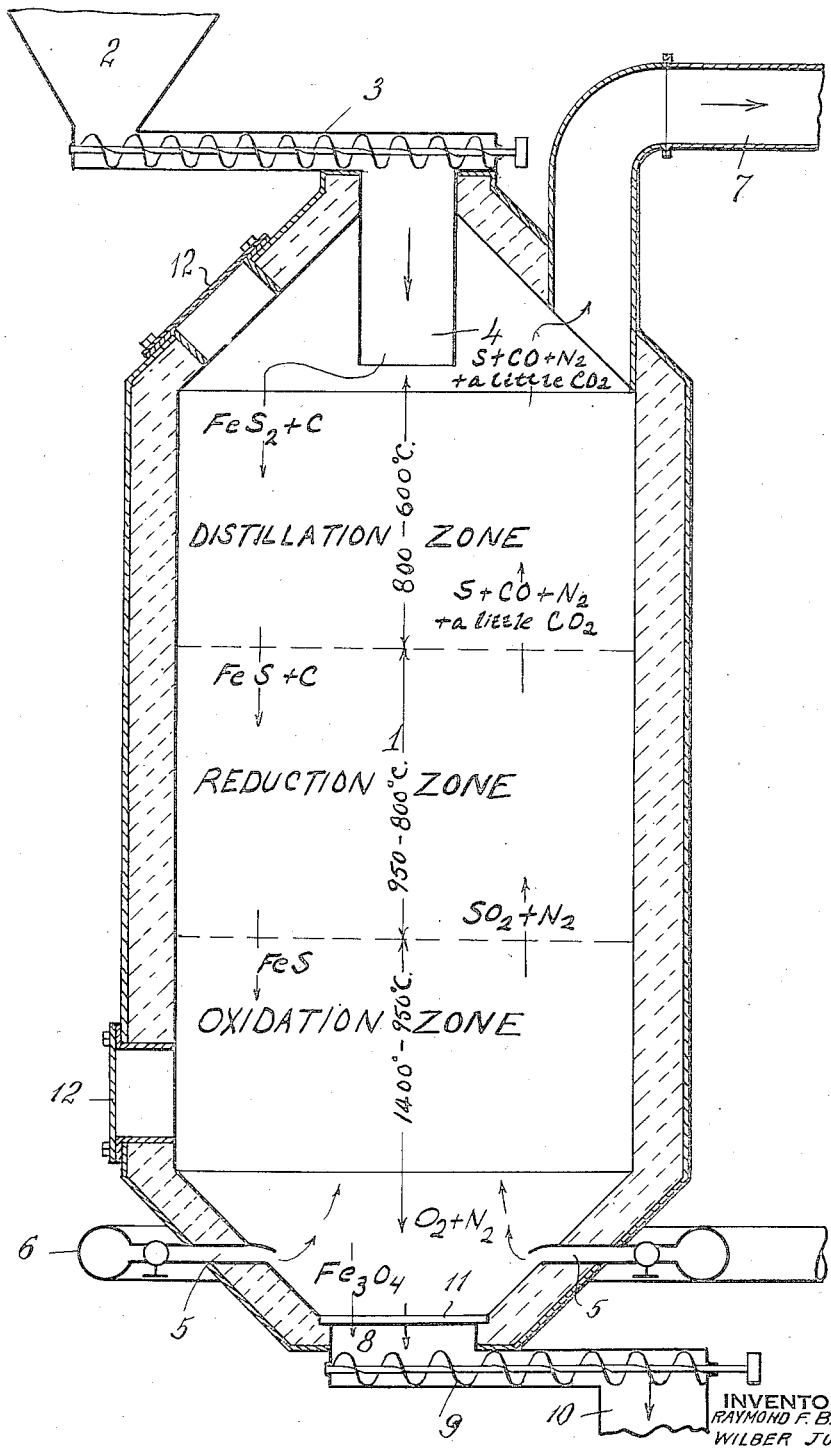

2,040,682

UNITED STATES PATENT OFFICE 2,040,682

RECOVERY OF SULPHUR

Raymond F. Bacon, Bronxville, N. Y., and Wilber Judson, Newgulf, Tex.

Application December 7, 1931, Serial No. 579,510

1 Claim. (Cl. 23—226)

This invention relates to the recovery of sulphur and has for its object an improved method of recovering sulphur from finely divided sulphide ores, flotation concentrates and the like. More particularly, the invention relates to sulphur recovery wherein a roasting operation is involved and a reducing agent is provided to reduce the sulphur dioxide formed to elemental sulphur.

It has been suggested heretofore to roast sulphide ores in mechanical roasting furnaces such as the Wedge, MacDougal or Herreshoff, with the provision of a carbonaceous reducing agent to reduce the sulphur dioxide formed to elemental sulphur. If the operation is to be properly conducted the sulphur liberated by distillation, or by reduction of the sulphur dioxide must not be subsequently subjected to any distinctly oxidizing atmosphere, or else the effect of the reactions which yield the elemental sulphur will be more or less nullified. The relative amounts of air and carbonaceous reducing agent supplied in the operation must ordinarily be such that the resulting carbon oxidation product will consist principally of carbon monoxide. If material amounts of carbon dioxide are formed it indicates either too low a temperature for the reduction of the sulphur dioxide by carbon, or the provision of oxygen in such amount as to considerably enhance the possibility of undesirable oxidation of the elemental sulphur formed.

With the restriction of the oxidation of the carbon to carbon monoxide however, the heat evolved from such oxidation and that evolved from the oxidation of the sulphur and iron in the ore will, in furnaces of the type noted, ordinarily not be sufficient to render the operation self-sustaining and, as a consequence, extraneous heat must be supplied to the reducing zone. In certain suggested modes of operation this heat has been provided by the use of reducing flames.

In accordance with our invention, this necessity of supplying supplemental heat may be substantially dispensed with and an efficient and economical operation provided. This we accomplish by utilizing a suspension or so-called "flash" roasting of the fines with the provision of a suitable amount of carbonaceous material to reduce the sulphur dioxide formed to elemental sulphur and maintain a substantially non-oxidizing atmosphere for the elemental sulphur produced. The flash roasting of fines results in the conservation of a materially larger amount of heat than is obtainable in mechanical furnaces of the nature noted, due principally to the greater speed of oxidation possible with relatively small heat radiation surfaces, and in the method of our invention this increase in the amount of heat available is utilized in the reduction operation in lieu of an extraneous source of heat as is generally required.

In the accompanying drawing an illustrative apparatus is shown by means of which the method of our invention may be carried out.

Reference numeral 1 designates a suspension roasting furnace constructed of firebrick or other suitable refractory and non-corrodible material, in suitable insulating thickness, into which the fines or flotation concentrates are introduced by means of a regulatable feed, in the illustration shown comprising a hopper 2 and screw conveyer 3 leading to the inlet duct 4. This feeding system is likewise utilized for the introduction of the carbonaceous reducing agent for the operation, which is provided in admixture with the sulphide fines.

Tuyères 5 are provided in the lower part of the furnace for the introduction of the air or other oxidizing gas, which tuyères communicate with a feed pipe 6 connecting with a suitable blower (not shown). Exit flue 7 provides for the discharge of the gases from the furnace in the upper portion thereof, and a cinder pit 8, screw conveyer 9 and cinder outlet 10 at the bottom of the furnace, protected by a grate 11, provide for the discharge of the solid cinder. The usual work holes 12 for the observation of and access to the interior of the furnace are disposed at desired points.

An illustrative mode of operation of the method of our invention is as follows: The interior of the furnace 1 is first preheated to a temperature at which the pyrites will be ignited, for example 850° C. or above, and this may be accomplished by the insertion of oil burners through the work holes 12, or in other suitable manner. Upon the completion of the preheating the flow of pyrites fines and carbonaceous reducing agent is then started through the inlet 4 by the action of the feeding device 3, and the flow of air or other equivalent oxidizing gas, which is passed in countercurrent relationship to the flow of the fines and reducing agent, is initiated at suitable velocity through the tuyères 5. The amount of reducing agent used should be at least such as to be theoretically sufficient for the reduction of all of the sulphur dioxide produced by oxidation of the fixed sulphur atom of the pyrites, and we prefer to utilize a carbonaceous reducing agent which is substantially free of hydrocarbons, for we find that the presence of these latter tend to result in an impure product. With pyrites containing about 45% of sulphur, for example coke breeze in an amount of 15-18% and somewhat more if necessary, will yield satisfactory results. The air or equivalent oxidizing gas is provided in amount sufficient to oxidize the fixed sulphur of the ore to sulphur dioxide and the iron to iron oxide, and the rate of introduction of the air should be so regulated that no material excess of oxygen is available in the operation. The presence of such excess will usually be indicated by the presence of material amounts of sulphur dioxide in the exit gases from the furnace. The air, and likewise the pyrites, may be preheated if desired and, further, the air may be enriched in oxygen to intensify its oxidizing action. The preheating of the oxidizing gas may, for example, be conveniently accomplished by heat-exchange with the hot cinder being discharged from the furnace, although of course other modes of preheating may be utilized.

The reactions which take place in the furnace may be considered as roughly divided into three reaction zones as follows: In the upper part of the furnace the pyrites and coke are subjected to the action of the heat rising from below and the feeble sulphur atom of the pyrites is volatilized. The temperature in this zone is preferably maintained in the neighborhood of from 600-700° C., and inasmuch as the atmosphere in this zone is maintained distinctly non-oxidizing, the volatile sulphur will be discharged in the elemental state. Passing downwardly through the furnace the mixture of coke and partially desulphurized pyrites, principally in the form of approximately iron monosulphide, pass into what may be designated as the reducing zone, in which coke reduces the sulphur dioxide arising from the lower part of the furnace. This reduction will proceed principally in accordance with the equations:

$$SO_2 + 2C = 2CO + S$$

$$2CO + SO_2 = 2CO_2 + S$$

Some amount of elemental sulphur may also be formed by the action of the iron monosulphide upon the sulphur dioxide, more or less in accordance with the equation:

$$4FeS + 3SO_2 = 2Fe_2O_3 + 7S$$

As for such carbon dioxide as is formed, the substantial amount of carbonaceous reducing agent which is present and the high temperatures existing in the operation distinctly favor the reduction of a considerable proportion of the carbon dioxide to carbon monoxide.

The atmosphere in the zone under discussion is strongly reducing, as is apparent, and it is highly desirable that the temperature in this zone be maintained as elevated as possible, short of the sintering temperature of the sulphide, in order to assure substantial completion of the reducing reaction. In general, a temperature of from 800-950° C is satisfactory and this temperature, as well as the temperature in the distillation zone and in the oxidation zone hereinafter referred to, may be readily maintained by proper regulation of the relative rates of feed of the pyrites-coke mixture, and the air, of the period of contact of the solid particles with the gaseous reagents, as controlled for example by the height of the furnace, and the velocity of the air current being introduced at the bottom of the furnace, and otherwise as will be apparent to one skilled in the art.

Leaving the reduction zone the iron sulphide can be considered as existing principally in the form of approximately iron monosulphide, and the coke as substantially consumed. If it is desired however, to provide supplemental heat by the combustion of carbon in the oxidation zone the coke may be supplied in sufficient amount so that the desired quantity reaches the oxidation zone without consumption, and in any case it is desirable that some amount of the coke proceed to the oxidation zone in order to provide a safety factor which will assure the maintenance of a non-oxidizing atmosphere in the upper parts of the furnace where elemental sulphur is present.

Passing into the oxidation zone, the fine shower of iron monosulphide will contact with the air and an intense oxidation takes place, resulting in the production of iron oxide and sulphur dioxide. It is undesirable however, that too great a temperature be attained in the first part of the oxidation zone for if it materially exceeds approximately 950° C. there will be a tendency for the iron monosulphide to sinter. When a quantity of iron oxide is formed however, the sintering tendency appears to be appreciably suppressed and, as a consequence, the temperatures in the lower part of the oxidation zone may be substantially elevated, for example to 1200-1400° C. Such high temperatures at the bottom of the furnace, moreover, will facilitate the oxidation of the small residual quantity of unoxidized sulphur in the ore which offers difficulty in removal. As has been noted hereinbefore, preheating of the air or use of oxygen-enriched air, or both may be utilized to assist such completion of the oxidation.

After complete desulphurization the hot iron oxide cinder, either as $Fe_2O_3$ or $Fe_3O_4$ depending upon the particular operating conditions, passes into the cinder pit 8 and from there is conveyed by the conveyer 9 to the cinder outlet 10. The iron oxide obtained is in a very pure form and is well adapted for subsequent blast furnace treatment. Moreover, it is very hot and, as has been noted, it can be conveniently utilized to preheat the air, to which end the air may be either passed directly through the hot cinder or in indirect heat-exchanging relationship therewith.

As for the sulphur from the pyrites, it will pass off through the gas exit 7 very largely in the form of elemental sulphur together with the other gaseous products of the operation. This sulphur will be constituted both of that liberated in the distillation zone and that produced from sulphur dioxide in the reduction zone, and due to the maintenance of a non-oxidizing atmosphere for the sulphur in its passage to the gas exit, the elemental sulphur once obtained will not be subjected to any subsequent oxidation loss. The gaseous products of the operation other than the sulphur which are found in the furnace gases comprise nitrogen from the air, carbon monoxide, carbon dioxide, sulphur dioxide, hydrogen sulphide and possibly some small quantity of carbon oxysulphide and carbon bisulphide, the presence and proportions of these accompanying gases being dependent upon the particular operating conditions. The temperature at which the furnace gases are discharged from the furnace is maintained sufficiently elevated, for example 350-450° C. or somewhat higher, that no premature condensation of the sulphur vapor in the gases will occur in the subsequent treatment.

Inasmuch as the roasting operation is directed to the treatment of finely divided material, the exit gases will carry entrained therewith a quantity of dust which it is desirable to remove before proceeding further with the treatment of the gases. This removal may be accomplished in any suitable manner, for example by the use of a mechanical baffle chamber, or chambers, electrostatic precipitation means, or both. After such operation the dust-free gases are then in condition for further treatment.

If the gases contain sulphur compounds in amount sufficient to warrant recovery of the sulphur therefrom, the gases are subjected to suitable treatment with that end in view. In the preferred mode of so treating the gases, we conduct them from the dust collecting system to a catalytic chamber containing a catalyst capable of accelerating the sulphur-producing reaction, for example bauxite. The typical reactions which take place in the catalytic chamber are as follows:

(1) $2CO + SO_2 = 2CO_2 + S$
(2) $2H_2S + SO_2 = 2H_2O + 3S$
(3) $2COS + SO_2 = 2CO_2 + 3S$
(4) $CS_2 + SO_2 = CO_2 + 3S$

If the gases should not contain sufficient sulphur dioxide to react with the various other compounds as noted, supplemental sulphur dioxide from a roasting operation or otherwise, may be introduced in the required quantity and likewise additional carbon monoxide, or water gas or producer gas may be supplied if desired.

The temperature in the catalytic chamber is preferably maintained in the neighborhood of 300–450° C., at which temperature the reactions noted proceed very effectively, and the maintenance of this temperature is aided by the elevated temperature at which the gases are discharged from the roasting furnace, e. g. approximately 350–450° C. While there will be some radiation loss in the passage of the gases through the dust collecting system, such heat addition as may be rendered necessary for the subsequent catalytic treatment will not be great.

The effluent gases from the catalytic chamber containing the sulphur are then treated to condense and collect the sulphur. This may be accomplished, for example, by passing the gases through a waste heat boiler, either alone or supplemented by a subsequent electrostatic precipitator, by which means the elemental sulphur is substantially completely removed from the accompanying gases.

By proceeding in accordance with the principles noted, a very effective method of recovering elemental sulphur from sulphide ores is provided. As a result of the use of a suspension roasting, the sulphur recovery operation may be conducted without the provision of supplemental heat; due to the continuous intimate contact of the finely divided charge with the gaseous reagents from the point of introduction to the point of discharge, with no opportunity for the solid materials to compact into a mass, the reactions will proceed rapidly and to substantial completion; and as the result of the maintenance of a distinctly non-oxidizing or reducing atmosphere for the elemental sulphur when formed and its discharge at the top of the furnace in a distinctly non-oxidizing zone, any possible nullification of the sulphur-producing reactions will be avoided.

While the illustrative operation has been described in particular relationship to pyrites fines or flotation concentrates, the method of our invention is likewise effectively applicable for the treatment of other finely divided metal sulphide materials, such for example as pyrrhotite, chalcopyrite, chalcocite, sphalerite, and the like, and it may also be utilized to treat manufactured as well as natural metal sulphide materials, such for example as mattes. Where the material treated does not contain volatile sulphur as does pyrites, the distillation zone of the illustrative operation described will of course be absent.

We claim:

The method of recovering sulphur from finely divided metal-sulphide bearing material in which part of the sulphur of the metal-sulphide is readily-volatile, which comprises passing said finely-divided material together with finely-divided coke each in suspension through a countercurrently flowing gaseous product containing sulphur vapor at a temperature not substantially lower than its temperature of production as hereinafter described and thereby liberating the readily-volatile sulphur of the metal-sulphide and producing a final gaseous product containing a substantial percentage of recoverable sulphur vapor, passing the residual material and accompanying coke each in suspension through a countercurrently flowing gaseous product containing sulphur dioxide at a temperature exceeding 800° C. and not substantially lower than its temperature of production as hereinafter described whereby said sulphur dioxide is substantially completely reduced by said coke and the aforesaid gaseous product containing sulphur vapor is produced, and then passing the residual material in suspension through a countercurrently flowing oxidizing gas at a temperature exceeding 950° C. whereby the remaining metal-sulphide is substantially completely converted to metal-oxide and the aforesaid gaseous product containing sulphur dioxide is produced.

RAYMOND F. BACON.
WILBER JUDSON.